US008006285B1

(12) United States Patent
Perlman

(10) Patent No.: US 8,006,285 B1
(45) Date of Patent: Aug. 23, 2011

(54) DYNAMIC DEFENSE OF NETWORK ATTACKS

(75) Inventor: Radia J. Perlman, Sammamish, WA (US)

(73) Assignee: Oracle America, Inc., Redwood City, CA (US)

( * ) Notice: Subject to any disclaimer, the term of this patent is extended or adjusted under 35 U.S.C. 154(b) by 1384 days.

(21) Appl. No.: 11/150,924

(22) Filed: Jun. 13, 2005

(51) Int. Cl.
*H04L 29/06* (2006.01)

(52) U.S. Cl. ............ 726/3; 726/11; 726/12; 726/22; 726/23; 726/24; 726/25; 709/223; 709/224; 709/225; 709/226; 455/410; 455/411

(58) Field of Classification Search ............ 726/1, 2, 726/3, 26, 27, 11, 12, 14, 22, 23, 24, 25; 713/153, 160, 188; 717/171; 709/224, 239, 709/226, 232; 455/410
See application file for complete search history.

(56) References Cited

U.S. PATENT DOCUMENTS

| 6,041,053 | A | 3/2000 | Douceur et al. |
| 6,070,219 | A | 5/2000 | McAlpine et al. |
| 6,163,539 | A | 12/2000 | Alexander et al. |
| 6,477,643 | B1 | 11/2002 | Vorbach et al. |
| 6,600,721 | B2 | 7/2003 | Edholm |
| 6,662,228 | B1 * | 12/2003 | Limsico ............ 709/225 |
| 6,714,960 | B1 | 3/2004 | Bitar et al. |
| 6,757,731 | B1 | 6/2004 | Barnes et al. |
| 6,772,334 | B1 * | 8/2004 | Glawitsch ............ 713/153 |
| 6,775,704 | B1 * | 8/2004 | Watson et al. ............ 709/229 |
| 6,831,893 | B1 | 12/2004 | Ben Nun et al. |
| 6,859,841 | B2 | 2/2005 | Narad et al. |
| 6,944,168 | B2 | 9/2005 | Paatela et al. |
| 7,046,665 | B1 | 5/2006 | Walrand et al. |
| 7,165,192 | B1 * | 1/2007 | Cadieux et al. ............ 714/43 |
| 7,177,311 | B1 | 2/2007 | Hussain et al. |
| 7,213,264 | B2 * | 5/2007 | Poletto et al. ............ 726/22 |
| 7,260,102 | B2 | 8/2007 | Mehrvar et al. |
| 7,313,142 | B2 | 12/2007 | Matsuo et al. |
| 7,324,447 | B1 * | 1/2008 | Morford ............ 370/231 |
| 7,386,889 | B2 * | 6/2008 | Shay ............ 726/26 |
| 7,404,210 | B2 * | 7/2008 | Lin ............ 726/22 |
| 7,464,402 | B2 * | 12/2008 | Briscoe et al. ............ 726/5 |
| 7,606,915 | B1 * | 10/2009 | Calinov et al. ............ 709/229 |
| 7,760,722 | B1 * | 7/2010 | Tripathi et al. ............ 370/389 |
| 2002/0120702 | A1 | 8/2002 | Schiavone et al. |

(Continued)

OTHER PUBLICATIONS

Christos Douligeris et al, DDoS attacks and defense mechanisms: classification and state-of-the-art, pp. 643-666, Elsevier B.V. 2003.*

(Continued)

*Primary Examiner* — Nasser Moazzami
*Assistant Examiner* — Shanto M Abedin
(74) *Attorney, Agent, or Firm* — Robert C. Kowert; Meyertons, Hood, Kivlin, Kowert & Goetzel, P.C.

(57) ABSTRACT

A distributed denial of service attack can be defended against by challenging requests at a machine upstream from the target of the attack. The upstream machine limits access to the victim machine in response to indication of the victim machine being attacked. The upstream machine begins trapping protocol data units destined for the victim machine and challenging requests to access the victim machine with tests that require sentient responses, such as Turing tests. The upstream machine then updates a set of rules governing access to the victim machine based, at least in part, on responses to the challenges or administered tests.

10 Claims, 3 Drawing Sheets

U.S. PATENT DOCUMENTS

| | | | |
|---|---|---|---|
| 2002/0120853 A1* | 8/2002 | Tyree | 713/188 |
| 2003/0037154 A1 | 2/2003 | Poggio et al. | |
| 2003/0110400 A1 | 6/2003 | Cartmell et al. | |
| 2003/0204621 A1* | 10/2003 | Poletto et al. | 709/239 |
| 2004/0059951 A1* | 3/2004 | Pinkas et al. | 713/202 |
| 2004/0181571 A1 | 9/2004 | Atkinson et al. | |
| 2004/0181581 A1 | 9/2004 | Kosco | |
| 2005/0015455 A1 | 1/2005 | Liu | |
| 2005/0108551 A1* | 5/2005 | Toomey | 713/185 |
| 2005/0108568 A1* | 5/2005 | Bussiere et al. | 713/201 |
| 2005/0132060 A1 | 6/2005 | Mo et al. | |
| 2005/0135243 A1 | 6/2005 | Lee et al. | |
| 2005/0138620 A1 | 6/2005 | Lewites | |
| 2005/0144441 A1* | 6/2005 | Govindarajan | 713/160 |
| 2005/0204159 A1 | 9/2005 | Davis et al. | |
| 2006/0026246 A1 | 2/2006 | Fukuhara et al. | |
| 2006/0031680 A1* | 2/2006 | Maiman | 713/182 |
| 2006/0041667 A1 | 2/2006 | Ahn et al. | |
| 2006/0048142 A1* | 3/2006 | Roese et al. | 717/176 |
| 2006/0069782 A1 | 3/2006 | Manning et al. | |
| 2006/0070066 A1 | 3/2006 | Grobman | |
| 2006/0168033 A1 | 7/2006 | Cai et al. | |
| 2006/0168056 A1 | 7/2006 | Gandhi et al. | |
| 2006/0174324 A1 | 8/2006 | Zur et al. | |
| 2006/0271631 A1 | 11/2006 | Qureshi et al. | |
| 2008/0168145 A1 | 7/2008 | Wilson | |
| 2008/0226047 A1 | 9/2008 | Reumann et al. | |
| 2008/0229415 A1 | 9/2008 | Kapoor et al. | |

OTHER PUBLICATIONS

Frank Kargl et al, Protecting Web servers from Distributed Denial of Service Attacks, pp. 514-524, ACM, 2001.*

William G Morein et al, Using Graphic Turing Tests to Counter Automated DDoS Attacks Against Web Servers, pp. 8-19, ACM, 2003.*

Frisch, AEleen, et al., Essential System Administration, Second Edition, *TCP/IP Network Management*, O'Reilly & Associates, Inc., Ch. 13, pp. 620-633, 1991, 1995.

Jin, Cheng, et al., "Hop-count filtering: an effective defense against spoofed DDoS traffic," in *Proceedings of the 10th ACM Conference on Computer and Communications Security* (Washington D.C., USA, Oct. 27-30, 2003), pp. 30-41, CCS '03, ACM Press, New York, NY.

Mirkovic, Jelena and Reiher, Peter, "A taxonomy of DDoS attack and DDoS defense mechanisms," *ACM SIGCOMM Computer Communication Review*, vol. 34, No. 2, pp. 39-53, Apr. 2004.

Mirkovic, Jelena, et al., "Alliance formation for DDoS defense," in *Proceedings of the 2003 Workshop on New Security Paradigms* (Ascona, Switzerland, Aug. 18-21, 2003). C. F. Hempelmann and V. Raskin, Eds., pp. 11-18, NSPW '03, ACM Press, New York, NY.

Morein, William G., et al., "Using graphic turing tests to counter automated DDoS attacks against web servers," in *Proceedings of the 10th ACM Conference on Computer and Communications Security* (Washington D.C., USA, Oct. 27-30, 2003) pp. 8-19, CCS '03, ACM Press, New York, NY.

Steinke, Steve, et al., Network Tutorial: A Complete Introduction to Networks, *Network Security and Backup Systems*, Section X, pp. 477-485, 513-514, 2000, CMP Books, San Francisco, CA.

Wang, Ju, et al., "Tolerating denial-of-service attacks using overlay networks—impact of topology," in *Proceedings of the 2003 ACM Workshop on Survivable and Self-Regenerative Systems: in Association with 10th ACM Conference on Computer and Communications Security* (Fairfax, VA, Oct. 31-31, 2003) pp. 43-52, SSRS '03, ACM Press, New York, NY.

Wang, XiaoFeng and Reiter, Michael K., "Mitigating bandwidth-exhaustion attacks using congestion puzzles," in *Proceedings of the 11th ACM Conference on Computer and Communications Security* (Washington DC, USA, Oct. 25-29, 2004) pp. 257-267, CCS '04, ACM Press, New York, NY.

Xu, Ying. and Guérin, Roch, "On the robustness of router-based denial-of-service (DoS) defense systems," *ACM SIGCOMM Computer Communication Review*, vol. 35, No. 2, pp. 47-60, Jul. 2005.

Dovrolis, C., Thayer, B. and Ramanathan, P., "HIP: Hybrid Interrupt—Polling for the network Interface," ACM SIGOPS Operating Systems Review, vol. 35, Iss. 4, Oct. 2001, 11 pages.

* cited by examiner

DYNAMIC DEFENSE OF NETWORK ATTACKS

BACKGROUND

The present invention relates to the field of computers. More specifically, the present invention relates to network security.

A distributed denial of service (DDoS) attack consists of an entity installing malicious code on a massive number of machines (e.g., 10-30 thousand machines), either directly or through propagation, that overwhelms a target network element with requests. The overwhelming number of requests consumes an enormous amount of the victim network element's resources. Thus, the victim network element is unable to respond to legitimate requests.

Some existing defense mechanisms attempt to verify the legitimacy of network addresses of incoming packets. Although such mechanisms may eliminate packets with spoofed network addresses, they do not defend against other means for delivery of a DDoS attack. For example, a DDoS attack delivered via compromised machines cannot be defended against since the compromised machines are using real network addresses.

SUMMARY

It has been discovered that a set of rules or permissions can be dynamically generated to defend against a network attack by administering Turing tests to sources that are attempting to access a network element being attacked. By requiring a sentient response to a challenge, such a defense mechanism can eliminate illegitimate traffic from zombie machines. Sources that have not responded correctly to an administered test are denied access to the victim network element, and are instead issued a challenge (i.e., test). While waiting for a valid response to an issued challenge, traffic from unknown sources can be handled differently. For example, protocol data units destined for the victim network element may be trapped until their sources respond to the administered Turing test (i.e., a general deny applied to all traffic destined for the victim network element), with the exception of some sources that are trusted by default. Realizations of the described invention may not trap or deny access while Turing tests are being administered, but instead restrict bandwidth available to suspect sources (assuming sources are suspect until they respond to their administered test(s)). Traffic from unknown sources may also continue to be forwarded as long as a given bandwidth quota for the victim network element is not exceeded.

These and other aspects of the described invention will be better described with reference to the Description of Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1A depicts an exemplary network initiating defense against a network attack. FIG. 1B depicts the exemplary intermediate network element dynamically updating permissions.

The use of the same reference symbols in different drawings indicates similar or identical items.

DESCRIPTION OF EMBODIMENT(S)

The description that follows includes exemplary systems, methods, techniques, instruction sequences and computer program products that embody techniques of the present invention. However, it is understood that the described invention may be practiced without these specific details. In other instances, well-known protocols, structures and techniques have not been shown in detail in order not to obscure the invention.

Figure 1A:
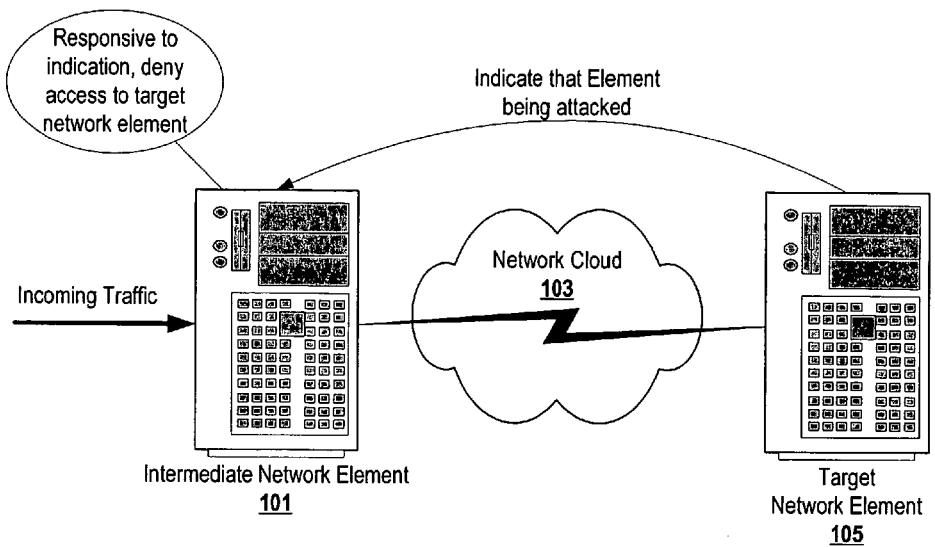
FIGS. 1A-1B depict an exemplary network with a dynamic defense against a network attack.
Figure 1B:
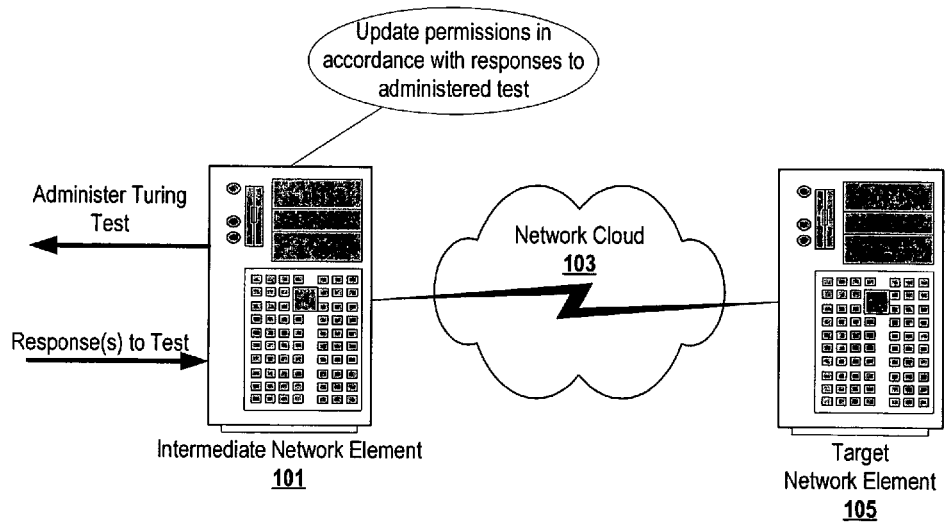

FIGS. 1A-1B depict an exemplary network with a dynamic defense against a network attack. FIG. 1A depicts an exemplary network initiating defense against a network attack. In FIG. 1A, a network includes an intermediate network element 101 (e.g., a firewall, a gateway, a router, a bridge, a switch, etc.), a target network element 105 (e.g., a server), and a network cloud 103. The network cloud 103 includes additional network elements in a path from the intermediate network element 101 to the target network element 105. These additional network elements may be within a local area network, such as a university network, a metropolitan area network, at least a portion of the backbone, etc. Also, the intermediate network element 101 may be directly coupled to the target network element 105.

Regardless of whether any intermediate network elements exist between the intermediate network element 101 and the target network element 105, a network attack targeting the target network element 105 is communicated to the intermediate network element 101. The network attack may be a denial of service attack, a distributed denial of service attack, etc. Furthermore, the network attack may be indicated by the target network element 105, a network element upstream from the target network element 105, detected by the intermediate network element 101, detected by one network element that reports the attack to the target network element 105, etc. In FIG. 1A, the target network element 105 indicates the network attack to the intermediate network element 101. Responsive to the indication, the intermediate network element 101 denies access to the target network element 105. For example, the intermediate network element 101 generates a set of rules or permissions for access to the target network element 105 that indicates null (i.e., no network elements are identified as having permission to access the target network element 105). The initial defense permissions do not necessarily have to completely deny access to the target network element 105. An initial set of permissions may indicate that certain source addresses are allowed to access the target network element 105. For example, the intermediate network element may allow access to a database server from source addresses within the same network as the database server. In another example, the intermediate network element 101 may deny access to a web server, with the exception of access requests from one or more source addresses identified as belonging to system administrators.

FIG. 1B depicts the exemplary intermediate network element dynamically updating permissions. The intermediate network element 101 administers Turing tests to machines identified by the source addresses in requests, hereinafter referred to as source elements, received subsequent to indication of the network attack. Turing tests are tests that require sentient responses (i.e., tests that require perceptive capabilities to answer and/or that cannot easily be answered by a machine). The set of permissions are updated in accordance with answers or responses to the administered tests. Those source elements that respond incorrectly are denied access to the target network element. Those source elements that respond correctly are allowed access to the target network element. Of course, those of ordinary skill in the art will appreciate that other permissions can be set besides allow and deny, such as allow read, allow write, etc.

Requiring sentient responses defends against compromised network elements and scripted answers. Restricting access to a victim network element responsive to indication of a network attack prevents the victim network element from being debilitated and reduces opportunity for additional malicious activity against the network element. In addition, challenging requests with tests prevents interference of legitimate access to the victim network element and maintains interaction with users by challenging them for a sentient response. Thus, a user is engaged to answer the tests during defense of the attack instead of waiting for a delayed response (e.g., instead of their machine idling while the intermediate network element attempts to sort out legitimate requests while bandwidth is being taxed). Furthermore, generating challenges to requests with Turing tests from an upstream network element allows a more powerful upstream machine to filter out requests instead of the victim machine, which is being drained of resources from the attack.

Figure 2:
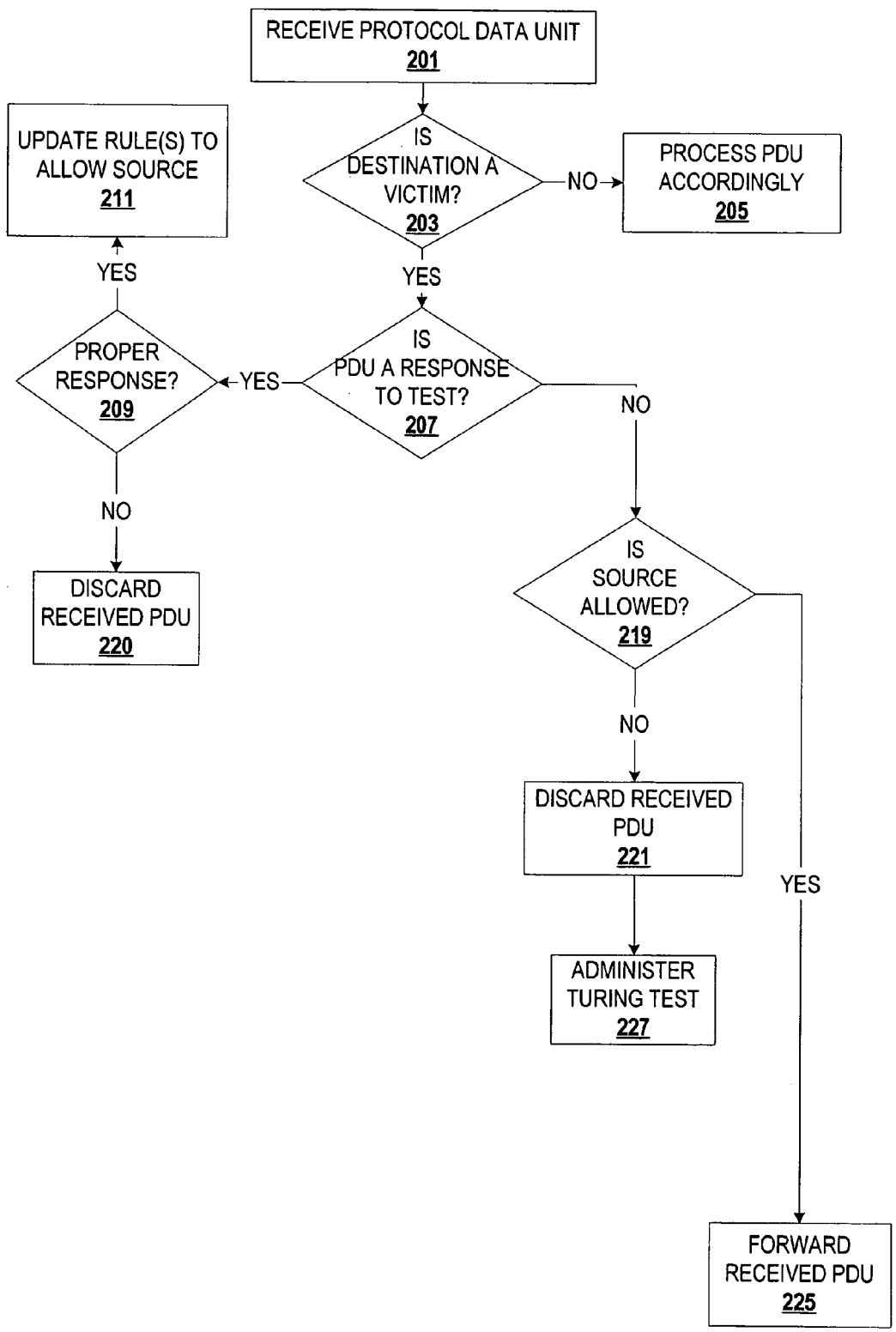
FIG. 2 depicts an exemplary flowchart for processing a protocol data unit received subsequent to indication of a network attack.

FIG. 2 depicts an exemplary flowchart for processing a protocol data unit received subsequent to indication of a network attack. At block 201, a protocol data unit (PDU) is received. A protocol data unit is a unit of data structured in accordance with a protocol, such as the Internet Protocol, Transfer Control Protocol, ATM, SONET, Ethernet, etc. A protocol data unit may be a cell, frame, packet, etc. At block 203, it is determined whether the destination of the PDU is a victim network element. If the destination is a victim network element, then control flows to block 207. If the destination is not a victim network element, then control flows to block 205.

At block 205, the PDU is processed accordingly. For example, the PDU is forwarded to its destination, further encapsulated, decapsulated, etc.

At block 207, it is determined whether the PDU is a response to a test. If the PDU is a response to a test, then control flows to block 209. If the PDU is not a response to a test, then control flows to block 219.

At block 209, it is determined whether the response is proper (i.e., whether the response is correct or valid). If the response is proper, then control flows to block 211. If the response is not proper, then control flows to block 220. At block 220, the received PDU is discarded. Although this exemplary flowchart depicts discarding of the PDU, realizations of the described invention may queue some traffic for various purposes and/or dependent upon the communication protocol (e.g., investigation of the PDUs, higher levels of guaranteed traffic delivery, etc.).

At block 211, the rules are updated to reflect ALLOW for the source of the PDU (the rules may be updated to reflect more than ALLOW, including various read and write permissions).

At block 219, it is determined whether the source of the received PDU is allowed. If the source is allowed, then control flows to block 225. If the source is not allowed (because it has not responded to the challenge or responded incorrectly), then control flows to block 221.

At block 225, the received PDU is forwarded to the destination.

From block 221, control flows to block 227. At block 227, a Turing test is administered to the source of the received PDU. To prevent circumvention of the sentient response requirement, tests can be administered in a variety of different ways. For example, a test may be randomly selected from a pool of tests, a test may be selected from a pool in a round-robin fashion, test sets may be replaced periodically, etc. Various techniques may be utilized to verify responses, such as recording information about an issued challenge in order to verify subsequent responses to the issued challenge, or implement tests that can be verified without recording such information. Techniques that record information about the challenges may limit the amount of time that such information is maintained (e.g., implementing a timer or time stamping on recorded information). For example, information may be maintained that associates particular challenges with answers. When the challenge is issued, the challenge also contains an indication of the challenges (e.g., an identifier). The PDU that responds to the challenge will include the challenge indication, allowing the administering machine to locate the appropriate answer for verification. In another example, an administering machine may record information about a challenge and the challenged machine (e.g., network address of the challenged machine). After a given amount of time, if a response is not received from the challenged machine for the issued challenge, then that recorded information is removed. Other techniques may also be used, such as stateless cookies. The challenge that is issued may be such that associations are not necessary between the challenges and answers. For example, the intermediate network element may issue a quiz to the source that can be verified with a value that is a function of at least a secret known to the intermediate network element and the network address of the source. Hence, the answer is something that cannot be predicted by the source, but is source specific.

Different techniques may be utilized to verify the identity of a source machine. For example, identity of a source may be solely based on IP address, or a combination of IP address and port, or IP address and any other information available to an intermediate node from the packet.

Although FIG. 2 illustrates setting of ALLOW or DENY permissions in access rules, other mechanisms can be employed to control access to a network element being attacked. For example, responsive to indication of a network attack, the bandwidth to the victim network element can be adjusted. A limited portion of the bandwidth that carries traffic to the victim network element can be allocated to traffic, regardless of whether the sources of the PDUs have responded to a test yet. The remaining portion of the bandwidth continues to carry traffic to the victim network element, but only traffic from sources that have properly responded to administered tests (or that are trusted by default). Constraining bandwidth available to unverified traffic allows legitimate users to continue to access the victim network element during an attack albeit with substantially less bandwidth, possibly preventing sessions from timing out and avoiding any inconveniences, even inconveniences of a short duration, from absolute denial of access.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.). For example, in FIG. 2, block 221 may be performed subsequent to block 227 or in parallel with block 227.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 3:
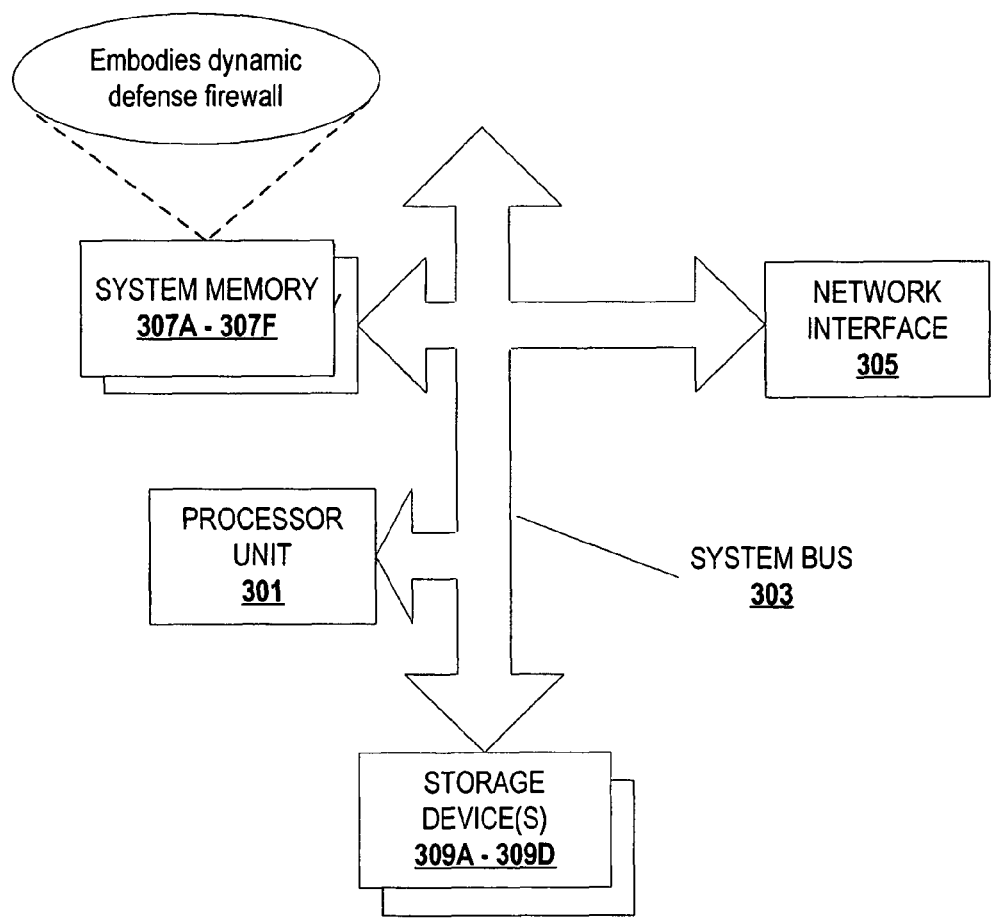
FIG. 3 depicts an exemplary computer system.

FIG. 3 depicts an exemplary computer system. A computer system 300 includes a processor unit 301 (possibly including multiple processors, a single threaded processor, a multi-threaded processor, a multi-core processor, etc.). The computer system 300 also includes a system memory 307A-307F (e.g., one or more of cache, SRAM, RDRAM, EDO RAM, DDR RAM, EEPROM, etc.), a system bus 303 (e.g., LDT, PCI, ISA, etc.), a network interface 305 (e.g., an ATM interface, an Ethernet interface, a Frame Relay interface, etc.), and a storage device(s) 309A-309D (e.g., optical storage, magnetic storage, etc.). Realizations of the invention may include fewer or additional components not illustrated in FIG. 3 (e.g., video cards, audio cards, additional network interfaces, peripheral devices, etc.). The processor unit 301, the storage device(s) 309A-309D, the network interface 305, and the system memory 307A-307F are coupled to the system bus 303. One or more of the system memories 307A-307F embody a dynamic defense firewall that administers tests, which require sentient responses, and updates a set of rules governing access to a victim network element in accordance with the responses to the administered tests. The dynamic defense firewall may be a single application embodied in the system memories 307A-307F, componentized application partially or entirely embodied in the system memories 307A-307F, etc. The functionality of the dynamic defense firewall may be implemented partly as code embodied in the system memories 307A-307F and partly implemented with hardware on the processor unit 301 and/or a coprocessor unit within the system 300.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. These realizations are meant to be illustrative and not limiting.

Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. An intermediate network element comprising a processor programmed to control network traffic to a target network element from a plurality of sources, and further programmed to:
   in response to determining that the target network element is under network attack, reserve a portion of bandwidth to the target resource for serving only trusted ones of the sources;
   in response to receiving messages from untrusted ones of the sources, administering respective challenges to the untrusted ones of the sources, wherein each challenge comprises a Turing test that requires a source-specific sentient response, wherein the challenges use stateless cookies such that the challenges are administered without recording associations between the challenges and answers to the challenges, wherein responses to the challenges are verified according to a function of a secret known to the intermediate network element and of respective network addresses of the sources; and
   in response to receiving a correct sentient response to one of the administered challenges from one of the untrusted sources, designating the one of the untrusted sources as trusted.

2. The intermediate network element of claim 1, wherein the processor is further programmed to verify identities of the sources with their respective network addresses and port identifiers.

3. The intermediate network element of claim 1, wherein the intermediate network element includes a router, gateway, firewall, switch, or bridge.

4. A method of defending against a network attack, comprising:
   an intermediate network element comprising a processor controlling access to a target network element from a plurality of network sources, the intermediate network element determining that the target network element is under network attack;
   in response to determining that the target network element is under attack, the intermediate network element reserving a portion of bandwidth to the target resource for serving only trusted ones of the plurality of sources;
   generating a set of permissions for the target network element responsive to indication of a network attack, wherein the set of permissions include either a default set of permissions or a null set of permissions;
   in response to receiving messages from untrusted ones of the plurality of sources, the intermediate network element administering respective challenges to the untrusted ones of the sources, wherein each challenge requires a correct source-specific sentient response, wherein the challenges use stateless cookies such that the challenges are administered without recording associations between the challenges and answers to the challenges, wherein responses to the challenges are verified according to a function of a secret known to the intermediate network element and of respective network addresses of the sources; and
   in response to receiving a correct sentient response to one of the administered challenges from one of the untrusted sources, the intermediate network element designating the one of the untrusted sources as trusted.

5. The method of claim 4, wherein the intermediate network element includes a router, gateway, firewall, switch, or bridge.

6. An apparatus, comprising:
a plurality of network interfaces at least partially implemented in hardware; and
a processor; and
a memory coupled to the processor, wherein the memory stores program instructions executable for:
dynamically generating a set of rules governing access to a target network element based, at least in part, on administration of Turing tests to network elements attempting to communicate with the target network element; wherein a plurality of messages sent to the target element by a given one of the network elements are delivered to the target element in response to determining that the network element has provided a correct source-specific sentient response to a Turing test administered to it by the apparatus, wherein each Turing test uses a stateless cookie such that each Turing test is administered without recording an association between the Turing test and answers to the Turing test, wherein responses to the Turing tests are verified according to a function of a secret known to the apparatus and of respective network addresses of the network elements; and
allocating, to the network element attempting communication, bandwidth to the target network element based, at least in part, on the set of rules governing access.

7. The apparatus of claim 6 further comprising means for verifying responses to the Turing tests.

8. The apparatus of claim 6 further comprising means for verifying identities of the network elements attempting to communicate with the target network element.

9. A non-transitory machine-readable storage medium, storing:

a first sequence of instructions executable to administer challenges requiring correct source-specific sentient responses to sources attempting to access a target network element, wherein the challenges are one or more Turing tests administered by a network element that hosts the non-transitory machine-readable storage medium, and wherein the challenges are administered without recording associations between the challenges and answers to the challenges;
wherein the first sequence of instructions is further executable to employ a stateless cookie mechanism to verify the responses, wherein the stateless cookie mechanism comprises computing a value that is a function of a secret key known to a network element that hosts the non-transitory machine-readable storage medium and of a network address of a source;
a second sequence of instructions executable to update access permissions to the target network element based, at least in part, on responses to the administered challenges; and
a third sequence of instructions executable to reserve a portion of bandwidth to the target network element for serving only trusted ones of the sources.

10. The non-transitory machine-readable storage medium of claim 9 wherein the third sequence of instructions is further executable to partition the bandwidth from the sources to the target network element into a first and second portion, wherein the first portion is allocated to serve those of the sources that have provided a correct sentient response to one or more of the challenges and the second portion is allocated to serve those of the sources that have not provided a correct sentient response one of the challenges.

* * * * *